(12) United States Patent
Crompton et al.

(10) Patent No.: US 11,661,847 B2
(45) Date of Patent: May 30, 2023

(54) RESIN-GROUTED ROCK BOLT ASSEMBLY WITH AN ADAPTED SEALING BUSH

(71) Applicant: INNOVATIVE MINING PRODUCTS (PTY) LTD, Johannesburg (ZA)

(72) Inventors: Brendan Robert Crompton, Johannesburg (ZA); Martin Cawood, Johannesburg (ZA); Paolo Ettore Pastorino, Johannesburg (ZA); Rual Abreu, Johannesburg (ZA)

(73) Assignee: INNOVATIVE MINING PRODUCTS (PTY) LTD, Johannesburg (ZA)

(*) Notice: Subject to any disclaimer, the term of this patent is extended or adjusted under 35 U.S.C. 154(b) by 0 days.

(21) Appl. No.: 17/419,533

(22) PCT Filed: Nov. 18, 2020

(86) PCT No.: PCT/ZA2020/050063
§ 371 (c)(1),
(2) Date: Jun. 29, 2021

(87) PCT Pub. No.: WO2021/102485
PCT Pub. Date: May 27, 2021

(65) Prior Publication Data
US 2022/0018253 A1    Jan. 20, 2022

(30) Foreign Application Priority Data
Nov. 22, 2019    (ZA) .................. 2019/07725

(51) Int. Cl.
*E21D 20/02*    (2006.01)
*E21D 21/00*    (2006.01)
*F16J 15/02*    (2006.01)

(52) U.S. Cl.
CPC ....... *E21D 20/028* (2013.01); *E21D 21/0033* (2013.01); *F16J 15/022* (2013.01)

(58) Field of Classification Search
CPC .... E21D 20/028; E21D 20/02; E21D 21/0033
See application file for complete search history.

(56) References Cited

FOREIGN PATENT DOCUMENTS

| DE | 10 2007 008966 |  | 9/2007 |  |  |
|----|---|---|---|---|---|
| DE | 10 2008 006233 |  | 7/2009 |  |  |
| DE | 102008006236 | A1 * | 7/2009 | ............. | E02D 5/808 |

(Continued)

OTHER PUBLICATIONS

Dialog machine translation of DE-102008006236-A1 (Year: 2022).*

(Continued)

*Primary Examiner* — Janine M Kreck
(74) *Attorney, Agent, or Firm* — Nixon & Vanderhye

(57) ABSTRACT

A single-use sealing bush which is adapted to form a sealing interface between a rock bolt and a nozzle of a grout delivery system, the sealing bush including a cylindrical body defined between a first end and a second end; a hole in the first end of the body that is adapted to receive the rock bolt; a pair of spaced apart annular ridges, on an outer cylindrical surface of the body, between which a grout distributing channel is defined; and an aperture which connects the channel to the recess; wherein each annular ridge is adapted to seal against the nozzle in a position which communicates a grout inlet port of the nozzle with the grout distributing channel.

2 Claims, 4 Drawing Sheets

(56) References Cited

FOREIGN PATENT DOCUMENTS

WO       2016/210456 A2    12/2016
WO       2020/047562       3/2020

OTHER PUBLICATIONS

International Search Report for PCT/ZA2020/050063, dated Mar. 15, 2021, 3 pages.
Written Opinion of the ISA for PCT/ZA2020/050063, dated Mar. 15, 2021, 7 pages.

* cited by examiner

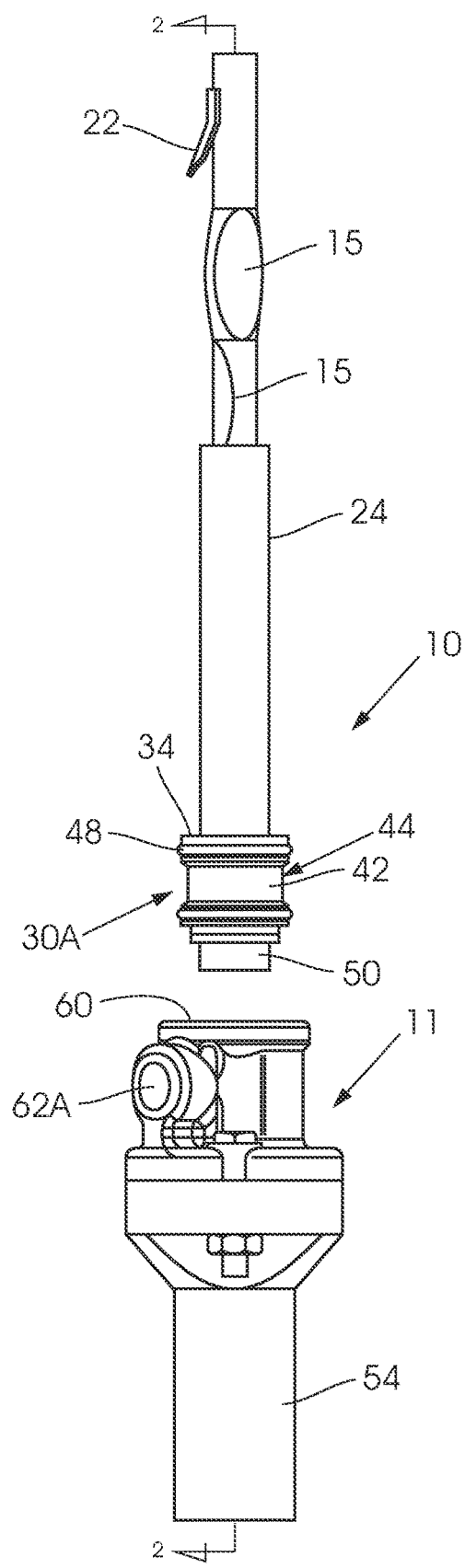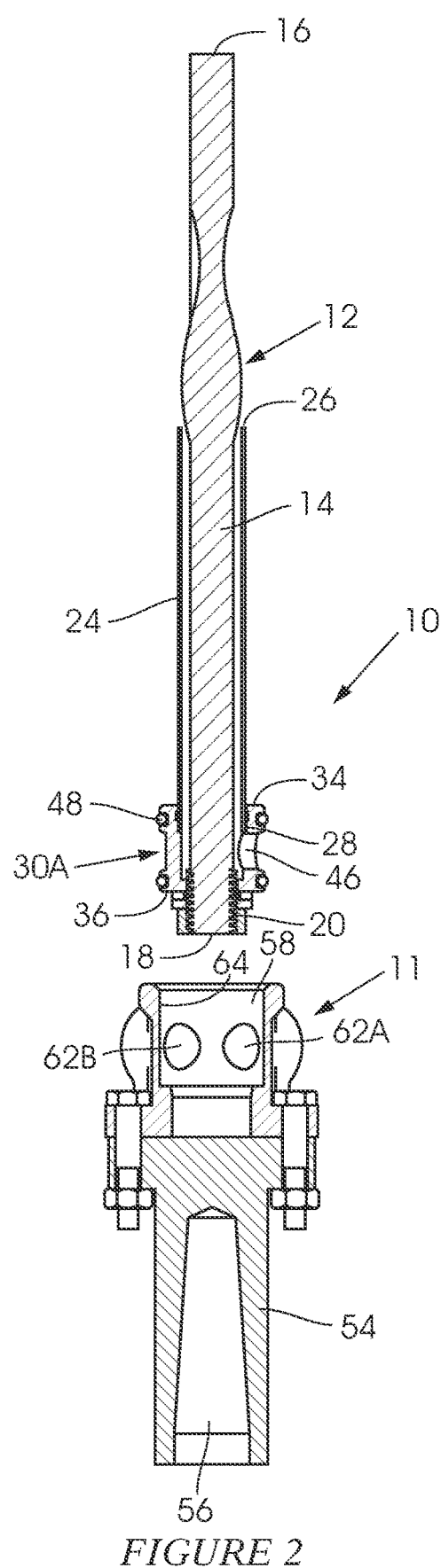
*FIGURE 1*  *FIGURE 2*

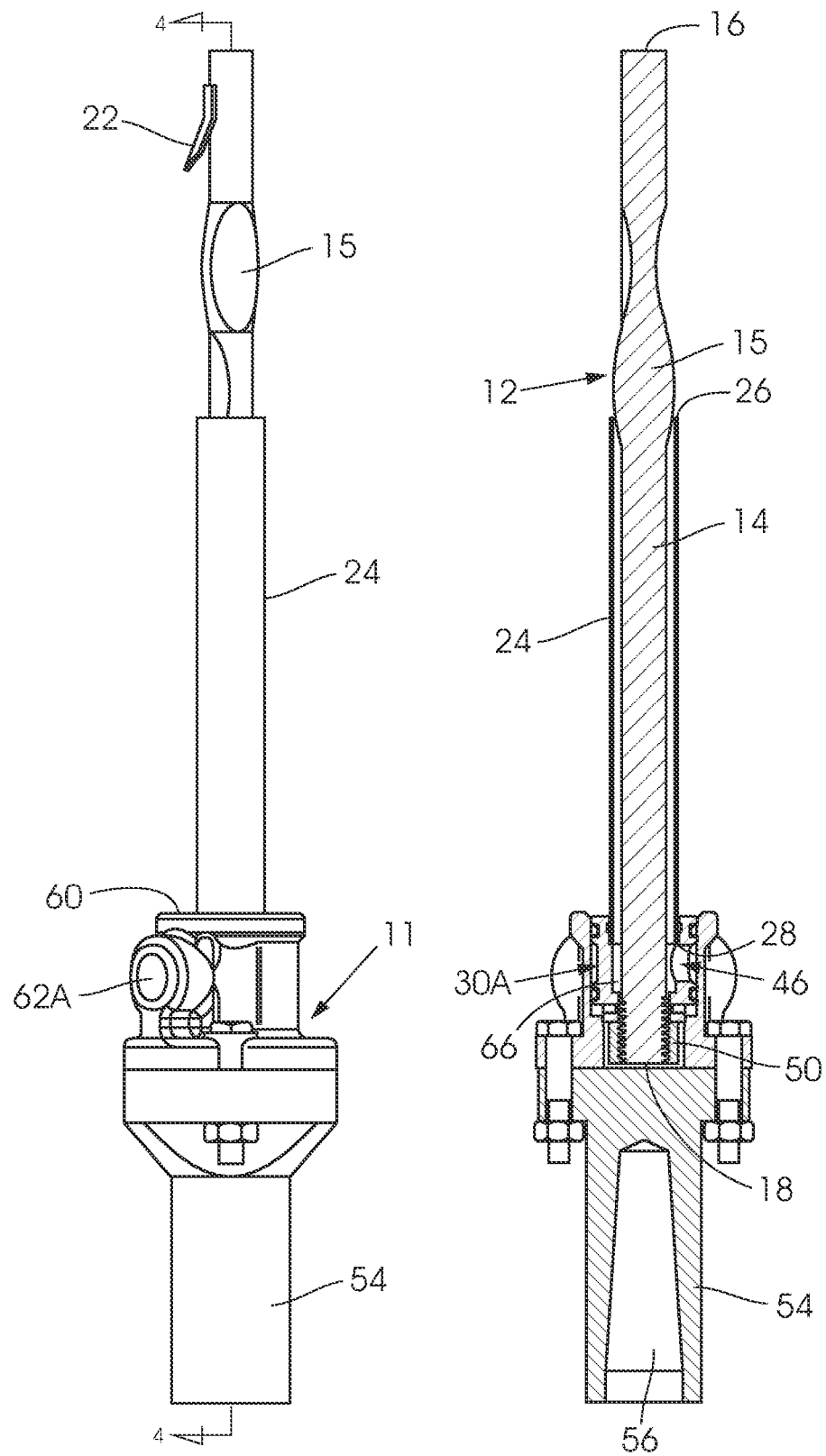

RESIN-GROUTED ROCK BOLT ASSEMBLY WITH AN ADAPTED SEALING BUSH

BACKGROUND OF THE INVENTION

This application is the U.S. national phase of International Application No. PCT/ZA2020/050063 filed 18 Nov. 2020, which designated the U.S. and claims priority to ZA Patent Application No. 2019/07725 filed 22 Nov. 2019, the entire contents of each of which are hereby incorporated by reference.

Field of the Invention

The invention relates to a rock bolt assembly adapted to be grouted into a rock hole and more specifically to an adapter type device that fits on the rock bolt to facilitate the sealing engagement of a nozzle of a grout delivery device with the rock bolt.

Description of the Related Art

Bonding agents, and support systems generally, are evolving from the typical rock bolt and cementitious grout applications of the past.

The prior art teaches a grout delivery system which is described in a specification to PCT/ZA2016/000017. This rock bolt assembly of this system has a rock bolt, partially located within a sleeve, which is preloaded before a grout or adhesive material is introduced. The assembly has a barrel with an aperture. A grout nozzle docks with the barrel. The nozzle that has the circumferential grout distributing channel to ensure that, irrespective of the radial orientation of the grout outlet port of the nozzle with the aperture, the grout moves about the channel to enter the aperture and then move along a grout channel comprised of the interior of the barrel and the sleeve.

A quick setting multi-part bonding agent (resin) cannot be used with the rock bolt assembly described above as the resin will set, somewhere within the assembly, at a point at which the resin components mix. It is within the distributing channel, as an integral part of the nozzle, that the resin components will mix and harden thereby blocking the nozzle and preventing reuse. This results in equipment downtime whilst clogged equipment is cleaned or replaced. The same problem is also experienced with use of conventional cementitious grouts where, after successive rounds of use, a build-up of the setting grout occurs in the ports and channels of the nozzle.

A solution to this problem is to flush the delivery hoses, of the mixed resin components, and the filler nozzle with a grease or other lubricant after pumping of the resin into the bolt is complete. This solution brings complexity and cost to the grout delivery system.

Hereinafter, reference to "grout" is reference to any adhesive material that is introduced into the rock hole to adhere the rock bolt within the rock hole.

The invention at least partially sources the aforementioned problem.

SUMMARY OF INVENTION

A single-use sealing bush which is adapted to form a sealing interface between a rock bolt and a nozzle of a grout delivery system, the sealing bush including a cylindrical body defined between a first end and a second end; a hole in the first end of the body that is adapted to receive the rock bolt; a pair of spaced apart annular ridges, on an outer cylindrical surface of the body, between which a grout distributing channel is defined; and an aperture which connects the channel to the recess; wherein each annular ridge is adapted to seal against the nozzle in a position which communicates a grout inlet port of the nozzle with the grout distributing channel.

The body may be a solid or unitary body, made of a rigid material, such as a metal, for example a steel, material, a composite material or a suitable rigid plastic material.

A groove may be formed along an apex of each ridge, adapted to receive a respective seal such as, for example, an O-ring seal.

Alternatively, the body may be a composite body, having an inner component made of a rigid material, for example a metal, composite or rigid plastic material, and an outer component made of a resiliently deformable material, for example a rubber or plastic material. The plastic material may be, for example, polyurethane which is applied to wrap the inner component.

The hole may be a cup-shaped formation, open at the first end, and closed at the second end, alternatively the hole may extend through the body, opening at each end.

The invention further provides a rock bolt assembly which includes:
a rock bolt with an elongate body which extends between a distal end and a proximal end;
a tubular sleeve which longitudinally extends between a leading end and a trailing end, on the rock bolt such that at least the proximal end of the bolt projects from the trailing end of the sleeve; and a nozzle docking bush which includes a cylindrical body defined between a first end and a second end, which has a hole in the first end of the body that is adapted to locate around the proximal end of the rock bolt and to sealingly engage the trailing end of the sleeve, which has a pair of spaced apart annular ridges, on an outer surface of the body between which a grout distributing channel is defined, and which has an aperture in the channel which opens the channel to the hole;
wherein the grout distributing channel, the aperture, the hole, and an interior of the sleeve define a grout passage; and
wherein, when a nozzle of a grout delivery system engages with the bush, each annular ridge is adapted to seal against the nozzle to provide fluid communication of a grout inlet port of the nozzle with the grout passage.

BRIEF DESCRIPTION OF THE DRAWINGS

The invention is further described by way of examples with reference to the accompanying drawings in which:

FIG. 1 is a view in elevation of a rock bolt assembly, in accordance with the invention, and a nozzle of a grout delivery system disengaged from the assembly;

FIG. 2 is a view in longitudinal section of the rock bolt assembly and the nozzle of FIG. 1;

FIG. 3 is a view in elevation of the rock bolt assembly of FIG. 1 with the nozzle engaged with the assembly;

FIG. 4 is a view in longitudinal section of the rock bolt assembly and the nozzle of FIG. 3;

DESCRIPTION OF PREFERRED EMBODIMENTS

Figure 5A:
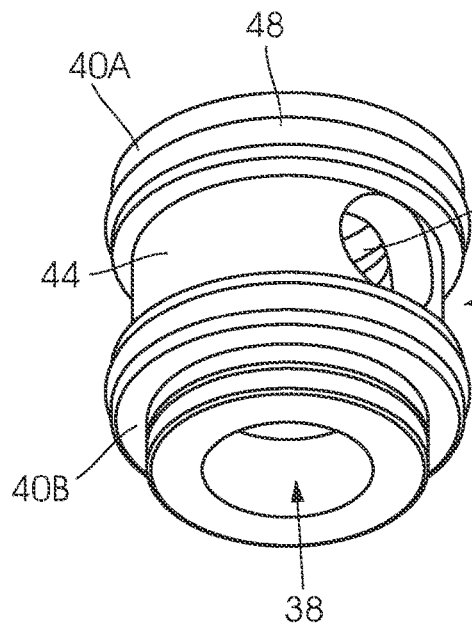
FIGS. 5A and 5B respectively illustrate, in perspective and in section respectively, a first embodiment of a nozzle docking bush of the invention.

Referring to FIGS. 1 to 4 of the accompanying drawings, a rock bolt assembly 10 is provided in accordance with the invention. The assembly is adapted to engage with a nozzle 11 on a leading end of a grout delivery system.

The assembly includes a rock bolt 12 having an elongate rod-like cylindrical body 14, which is adapted with paddle anchors 15, and which extends between a leading end 16 and a trailing end 18. The body has a threaded end section 20 which extends from the trailing end. The bolt can have a retaining element 22 towards the leading end, adapted to hold the bolt in a rock hole after insertion.

The assembly 10 includes an elongate sleeve 24 which extends between a leading end 26 and a trailing end 28. The sleeve is adapted to receive the rock bolt 12 with the distal and proximal ends (16, 18) of the bolt extending beyond the leading end and the trailing end (26, 28) respectively of the sleeve. The sleeve is held in position, on the bolt 12, by frictional abutment of the leading end with an adjacent paddle anchor 15, which anchor extends beyond the circumferential dimension of the bolt body 14.

Figure 5B:
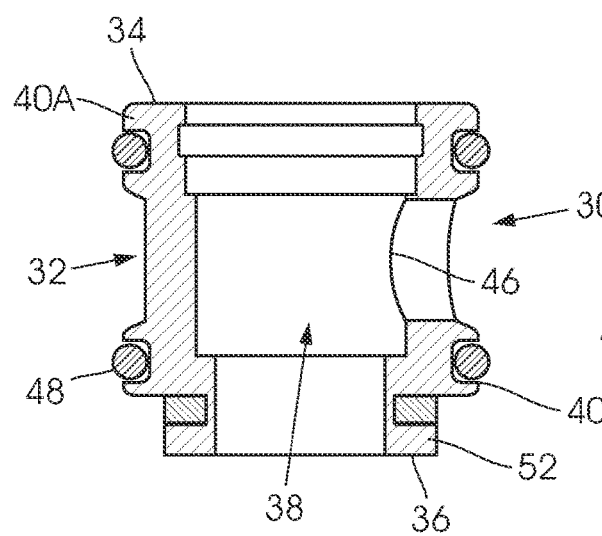

The assembly 10 further includes a nozzle docking bush 30. This bush can be either of the two embodiments of the bush, 30A and 30B, illustrated in FIGS. 5 and 6 respectively. In further describing the assembly, reference to the bush is reference to the embodiment 30A.

The bush 30, in this example, has a unitary cylindrical body 32 made of a steel material which is machined pressed or cast. Alternatively, the body may be moulded from plastic or composite material. The cylindrical body extends between a first end 34 and a second end 36, and has a central hole 38 which opens at each of these ends. The body has a pair of spaced apart annular ridges (respectively designated 40A and 40B) rising from an outer cylindrical surface 42. Between the ridges, a circumferential grout distributing channel 44 is defined. Within the channel, the body 32 has an aperture 46 which is formed through a wall of the body, opening the channel to the central hole 38.

Each annular ridge 40, in the embodiment 30A, is adapted with a machined annular groove into which a respective O-ring seal 48 fits.

To engage the bush 30 to the rock bolt 12, the rock bolt body 14 is passed through the bush's central hole 38, proximal end 18 leading. At least a part of the hole is diametrically dimensioned with small tolerance to fit over the bolt body in snug or friction fit. To hold the bush in position, above the threaded section 20, against the trailing end 28 of the sleeve 24, a nut 50 is threaded onto the threaded section, behind the bush. The nut will move into contact with the trailing end 36 of the bush, forcing the bush against the sleeve which is prevented from moving up the bolt body 14 by abutment with the paddle 15.

As an alternative to the nut as a means of engaging the bush 30 to rock bolt it is anticipated, within the scope of the invention, that the body 14 is formed with a female thread at or towards the proximal end.

A load indicating formation 52 can be included, made integral with the bush 30, to indicate when load on the barrel has reached a predetermined level.

A washer or faceplate (not shown) can be located against the first end 34 of the bush body 32.

The assembly 10 is designed to be mechanically inserted into a predrilled rock hole (not shown) with the aid of a drill rig (not shown). The drill rig will have a plurality of arms (not shown) on a carousel which is adapted to drill the hole, insert the rock bolt assembly and grout the inserted assembly in the hole. One of these arms will have, at a leading end, a tapered spigot (as with this example) or a threaded shaft.

An adapter 54 has a tapered recess 56 into which the tapered spigot of the drill rig arm inserts. The grout nozzle 11 is attached to this adapter. The grout nozzle has a cylindrical mouth 58 in a leading end 60 of the nozzle. A plurality of grout inlet ports (respectively designated 62A and 62B) open into the mouth. In this example there are two ports with each port connecting to a respective supply conduit (not shown) carrying either a first or a second adhesive component of a resin. The ports deliver these components to the nozzle mouth.

It is anticipated that the resin components can be mixed prior to introduction to the rock bolt assembly 10 through the bush 30. In such case there will only be need for a single inlet port 62.

Prior to grouting, the rock bolt assembly 10, is inserted into the hole with the aid of the drill rig as mentioned above. When fully inserted, held within the hole by the retaining element 22 and with a faceplate (not shown), pre-mounted to abut the first end 34 of the bush, forced against the rock wall adjacent the rock hole, the assembly is ready to be grouted.

A first step in grouting the assembly 10 requires operation of the drill rig to align the grout nozzle 11 with the proximal, and now projecting, end 18 of the rock bolt 12 and then to move the nozzle over this end. In so doing, the end 18, carrying the bush 30 and the nut 50, is received in the mouth 58 of the nozzle. This engagement is illustrated in FIG. 4.

The mouth 58 is dimensioned to receive the whole of the bush in snug fit. The O-ring seals 48 of the bush make sealing contact with an inner surface 64 of the mouth to seal the grout distributing channel 44 closed against this wall thus providing a sealed conduit into which the adhesive components are delivered from the respective ports 62. FIG. 2 illustrates these ports opening into the mouth which, when the bush is located therein, would be positioned coincident with the channel.

Once within the assembly and under pump action, the adhesive components are caused to move from the distributing channel 44, through the aperture 46, into an annular space 66 between the bush 30 and the rock bolt 12, up through the interior of the sleeve 24 and finally into the rock hole. Along this course of flow, the adhesive components begin to turbulently mix and harden or, if the components are already mixed, merely to harden.

After grouting is completed, the arm is withdrawn to remove the nozzle 11 from engagement with the rock bolt's proximal/projecting end 18. During the withdrawing action, the seals 48 act against the inner surface 64 of the mouth 58 to wipe this surface of residual resinous material which, if left, would harden and clog this part of the nozzle, not making possible imminent reuse.

As the bush is single-use, in the sense that it is a single use item, the hardening of residual resin within the distributing channel 44 or aperture 46 is of little consequence.

Figure 6A:
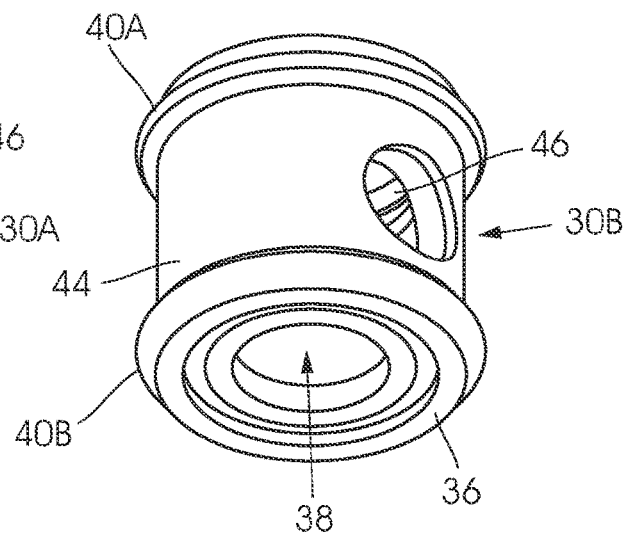
FIGS. 6A and 6B respectively illustrate, in perspective and in section respectively, a second embodiment of a nozzle docking bush of the invention.
Figure 6B:
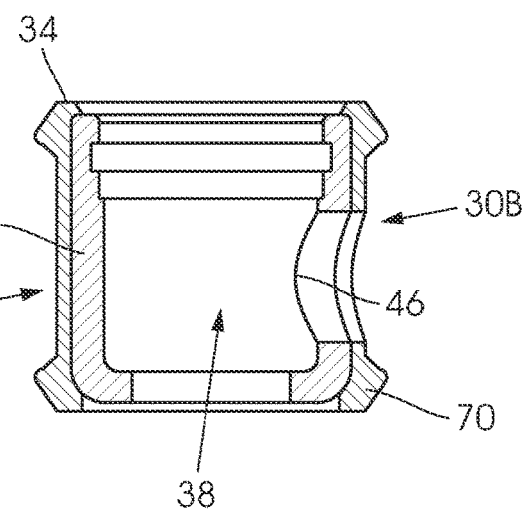

In another embodiment of invention, the bush 30B is provided which is illustrated in FIG. 6. In this embodiment, the body 32 is not unitary, as with the embodiment 30A, but rather is a composite body, having an inner component 68 made of a rigid material, for example a metal (steel) material, and an outer component 70 made of a resiliently deformable material, for example a plastic (polyurethane) material, which shrink wraps the inner component.

The pair of spaced apart annular ridges 40 are integrally moulded as part of the outer component. And, as this component consists of a resiliently deformable material, there is no need to provide a separate sealing element. The sealing function is inherent in the configuration and material of manufacture.

Figures 7A, 7B:
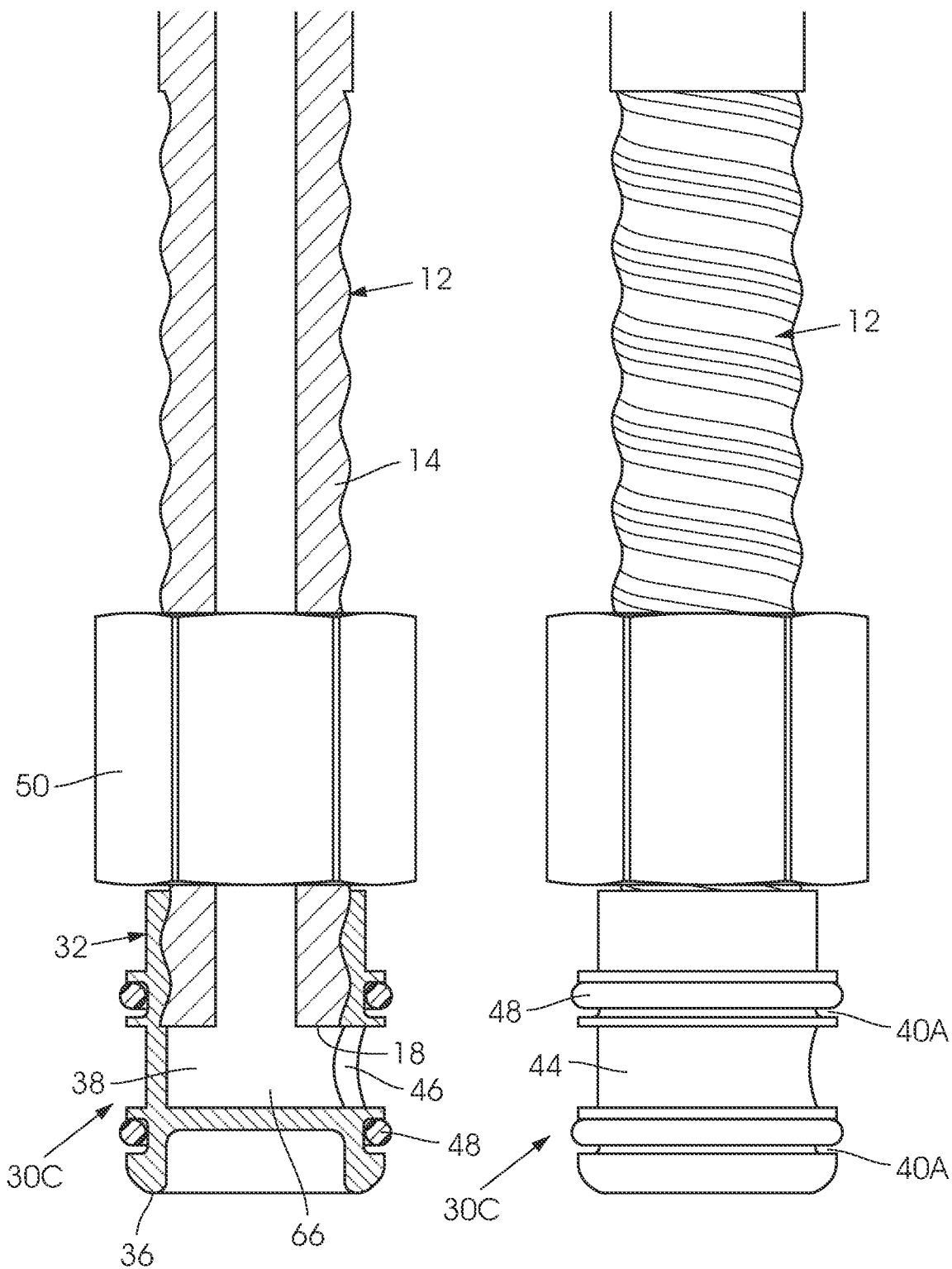
FIGS. 7A and 7B respectively illustrate, in longitudinal section and in elevation respectively, a third embodiment of a nozzle docking bush of the invention.

A further embodiment of the invention is illustrated in FIG. 7. In describing this embodiment, like features bear like designations.

The essential difference between the bush 30C of this embodiment and the bush (30A, 30B) of the previous embodiments is that the central hole 38 does not extend through the body 32. It is blind towards the second end 36. This is an adaptation, along with internal threads 72 within the hole, which allows the bush to be threaded onto the threaded end 20 of a rock bolt 12 which is provided with a longitudinally extending grout bore 74.

When the nozzle 11 docks with the bush 30C, the resin/grout is pumped around the distributing channel 44 and into the aperture 46, in a manner similar to the earlier embodiments. However, what differs is that, after the resin collects within the space 66, the resin is caused to flow into and through the bore 74. The bore is functionally analogous with the interior of the sleeve 24 of the rock bolt described above.

The invention claimed is:

1. A single-use sealing bush which is adapted to form a sealing interface between a rock bolt and a nozzle of a grout delivery system, the sealing bush including a cylindrical body defined between a first end and a second end; a hole in the first end of the body that is adapted to receive the rock bolt, a pair of spaced apart annular ridges, on an outer cylindrical surface of the body, between which a grout distributing channel is defined, and an aperture which connects the channel to the hole, wherein each annular ridge is adapted to seal against the nozzle in a position which communicates a grout inlet port of the nozzle with the grout distributing channel, wherein the body is a composite body comprised of an inner component made of a rigid material that includes the hole and an outer component made of a resiliently deformable material that includes the pair of spaced apart annular ridges.

2. The single-use sealing bush according to claim 1 wherein the hole extends through the body, opening at each end.

* * * * *